US012110396B2

United States Patent
Allen et al.

(10) Patent No.: US 12,110,396 B2
(45) Date of Patent: Oct. 8, 2024

(54) GEL COMPOSITIONS

(71) Applicants: UNIGEL IP LIMITED, Central (HK); UNIGEL LIMITED, East Sussex (GB)

(72) Inventors: Scott Allen, Central (HK); Adrian Chisholm, Central (HK); Mukhtiar Singh Sohal, Central (HK); Ivan Tory, Central (HK)

(73) Assignees: UNIGEL IP LIMITED, Central (HK); UNIGEL IP LIMITED, East Sussex (GB)

(*) Notice: Subject to any disclaimer, the term of this patent is extended or adjusted under 35 U.S.C. 154(b) by 420 days.

(21) Appl. No.: 17/378,510

(22) Filed: Jul. 16, 2021

(65) Prior Publication Data

US 2022/0017747 A1 Jan. 20, 2022

(30) Foreign Application Priority Data

Jul. 17, 2020 (GB) .................................. 2011029.2

(51) Int. Cl.
| | |
|---|---|
| *C08L 91/00* | (2006.01) |
| *C08J 3/09* | (2006.01) |
| *C08J 3/11* | (2006.01) |
| *G02B 6/44* | (2006.01) |

(52) U.S. Cl.
CPC .............. *C08L 91/00* (2013.01); *C08J 3/091* (2013.01); *C08J 3/11* (2013.01); *G02B 6/443* (2013.01); *C08L 2201/08* (2013.01); *C08L 2201/56* (2013.01); *C08L 2205/03* (2013.01); *C08L 2205/20* (2013.01)

(58) Field of Classification Search
CPC .. C08L 91/00; C08L 2201/08; C08L 2201/56; C08L 2205/03; C08L 2205/20; C08L 9/02; C08L 9/06; C08J 3/091; C08J 3/11; C08J 3/075; C08J 9/02; G02B 6/443; G02B 6/44384; C08K 7/22; H01B 3/18
See application file for complete search history.

(56) References Cited

U.S. PATENT DOCUMENTS

| | | | |
|---|---|---|---|
| 5,994,450 A | 11/1999 | Pearce | |
| 7,253,217 B2* | 8/2007 | Sohal | C08J 9/32 |
| | | | 523/218 |
| 2015/0205065 A1* | 7/2015 | Levy | G02B 6/44384 |
| | | | 385/100 |
| 2018/0051225 A1* | 2/2018 | Zhang | H01B 3/441 |
| 2019/0162925 A1* | 5/2019 | Esseghir | H01B 3/441 |
| 2019/0329207 A1* | 10/2019 | de Groot | C08L 53/025 |
| 2020/0056035 A1* | 2/2020 | de Groot | H01B 7/282 |
| 2022/0017748 A1* | 1/2022 | Allen | G02B 6/4429 |

FOREIGN PATENT DOCUMENTS

| | | |
|---|---|---|
| CN | 105924823 A | 9/2016 |
| CN | 108359159 A | 8/2018 |

OTHER PUBLICATIONS

Combined Search and Examination Report of GB2011029.2 dated Jan. 26, 2021 (6 pages).

* cited by examiner

*Primary Examiner* — Ellen M McAvoy
(74) *Attorney, Agent, or Firm* — Quarles & Brady LLP

(57) ABSTRACT

This invention relates to gel compositions for filling cables, such as communication cables, in particular to gel compositions containing microspheres, to cables comprising said gels, and to methods of preparing such gel.

16 Claims, 1 Drawing Sheet

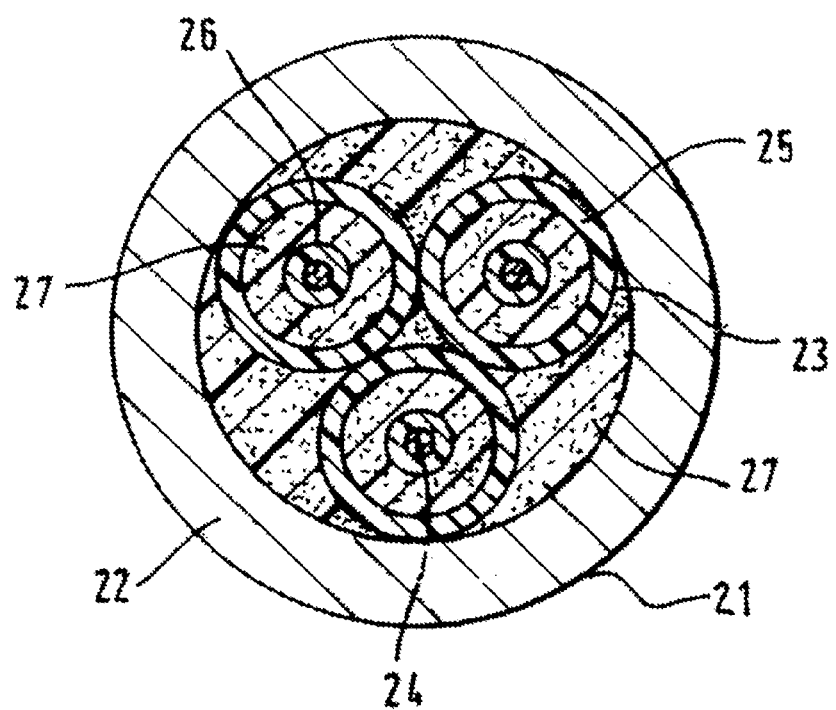

GEL COMPOSITIONS

CROSS-REFERENCE TO RELATED PATENT APPLICATIONS

The present application is a U.S. Application under 35 U.S.C. § 111(a) and claims the benefit of priority under 35 U.S.C. § 119 to United Kingdom Application GB 2011029.2, filed on Jul. 17, 2020 the content of which is incorporated herein by reference in its entirety.

TECHNICAL FIELD

This invention relates to gel compositions for filling cables, such as communication cables, in particular to gel compositions containing micro spheres, and to methods of preparing such gels.

BACKGROUND OF THE INVENTION

Communications cables typically comprise a signal-conducting core surrounded by a protective sheath. The core can, for example, conduct light signals or electrical signals. In many cables the space between the conductor and sheath contains a filler, the role of which is to protect and cushion the core from external forces that might be produced by, for example, bending or coiling, particularly in the case of fibre-optic cables. A further role of the filler is the prevention of water ingress which is particularly pertinent should the core comprise a metal such as copper. In order to fulfil these requirements, the filler must display a number of characteristics. The filler must be of sufficient viscosity in order to allow lateral movement of the core which occurs during, for example, bending, coiling or laying. The viscosity must however not be so low as to allow a drip wise loss of filler during vertical laying of cables. Moreover, this balance of properties must be maintained over a temperature range of −40 to +80 C. The filler must be formulated to be chemically compatible with cable grade polymers, which includes not only the cable sheath but also coatings typically found on optical fibres. The filler should also show a high degree of elasticity in order to absorb the force of impacts that the cable sheath may undergo during its operating lifetime. Relatively high ambient temperatures can be reached through fabrication of such cables resulting in thermal expansion of the filler, which then leads to the formation of holes and cavities on cooling. Such holes and cavities can potentially become a water path, which in fibre optic cables can lead to attenuation of the light wave guide. Thus, cable fillers should ideally show low thermal conductivity. For electrical applications or cores transmitting electrical signals, it is advantageous if the filler has a low permitivity, thus insulating the conducting core. This has the additional benefit of rendering the filler hydrophobic thereby protecting the core from water ingress. The anti-drip resistance of fillers can be improved by reducing their specific weight. Finally, for easy handling, it is preferred if the filler is semi-dry to the touch, rather than sticky.

WO2001/74480A1 discusses a composition suitable for use as a cable filler, which comprises a dispersion of microspheres in a gel comprising an oily base and an organic polymeric gelling agent. The oil may be a naphthenic or paraffinic processing oil, a mineral oil, a synthetic product such as a polybutane, or a silicone oil.

SUMMARY OF THE INVENTION

The invention provides a composition suitable for use as a cable filler, comprising a dispersion of compressible hollow microspheres in a gel, the gel comprising: a base oil comprising a minimum of 80% bio-based oil; and an organic polymeric gelling agent comprising a styrene block copolymer.

The invention further provides a cable, such as a communications cable, containing as a cable filler a composition as defined hereinabove.

The invention further provides a process for making a cable, such as a communications cable, more particularly a fibre optic cable, containing as a filler a composition as defined hereinabove.

BRIEF DESCRIPTION OF THE DRAWINGS

FIG. 1 shows a cross-sectional view of a fibre optic cable.

DETAILED DESCRIPTION

Communications cables have conventionally been manufactured using polyethylene as outer insulation. However, polyethylene is less suitable for use with fibre optic cables and instead, polypropylene is preferred due to its improved properties, such as a higher bend radius. It has been found that the use of polypropylene is not compatible with the base oils conventionally used in filler compositions for cables: oils such as naphthenic or paraffinic processing oil, a mineral oil, a synthetic product such as a polybutane, or a silicone oil. These conventional base oils typically have a weight gain compatibility indication in the range of 15 to 20% or greater when measured according the procedure described hereinbelow.

As a first embodiment, Embodiment 1, the invention provides a composition suitable for use as a cable filler, comprising a dispersion of compressible hollow microspheres in a gel, the gel comprising: a base oil comprising a minimum of 80% bio-based oil; and an organic polymeric gelling agent comprising a styrene block copolymer.

As a second embodiment, Embodiment 2, the invention provides a composition as defined in Embodiment 1, wherein the base oil comprises sunflower oil, rapeseed oil, castor oil, canola oil, soybean oil, corn oil, or a mixture thereof.

As a third embodiment, Embodiment 3, the invention provides a composition as defined in Embodiment 1 or 2, wherein the base oil comprises sunflower oil, rapeseed oil, canola oil, or a mixture thereof.

As a further embodiment, Embodiment 4, the invention provides a composition as defined in any preceding Embodiment, wherein the base oil comprises high-oleic acid sunflower oil, high-oleic acid rapeseed oil, high-oleic acid canola oil, or a mixture thereof.

As a further embodiment, Embodiment 5, the invention provides a composition as defined in any preceding Embodiment, wherein the composition comprises from 50-99 wt % base oil.

As a further embodiment, Embodiment 6, the invention provides a composition as defined in any preceding Embodiment, wherein the composition comprises from 80-99 wt % base oil.

The compositions of the invention comprise compressible hollow micro spheres each comprising a polymeric shell encapsulating a blowing agent. The polymeric shell is generally formed from a copolymer, for example a copolymer of vinylidene chloride and acrylonitrile, or a copolymer of acrylonitrile and methacrylonitrile.

The blowing agent can, for example, be isobutane or isopentane. In addition, the micro spheres can be expanded or unexpanded. The polymeric shell of the unexpanded micro spheres softens on heating, so allowing the evaporating blowing agent to expand the volume of the micro spheres. Such hollow micro spheres whether expanded or initially unexpanded, display a high degree of elasticity and additionally have a low specific weight. Use of such micro spheres in the gels disclosed in this invention is advantageous in that they lower the overall specific weight of the gels and thus reduce or eliminate drip-out during vertical laying of the cable.

The hollow nature of the micro spheres means that the proportion of solid material is very low relative to the volume. Thus their addition to the gels of the invention leads to a reduction in the overall thermal conductivity and a reduced likelihood of decomposition of any of the components of the gel or the creation of voids under the elevated temperatures reached during cable manufacture. The superior elastic properties of the hollow micro spheres over their solid counterparts gives improved protection to, for example, light wave guides during conveying, coiling or laying. Additionally, the problem of attenuation of light waveguides due to the presence of holes or cavities within the cable filling is also reduced as any increase in volume of the bulk of the filler due to heating during cable manufacture is matched by a converse reduction in the volume of the hollow micro spheres. Due to the compressible nature of such hollow micro spheres, their typical diameters are greater than those of their solid counterparts. In fibre optic cable applications, diameters in the range of the diameter of the light wave guide can be used. For expanded hollow micro spheres, the diameters will typically lie in the range 1-200 μm, more usually less than 100 μm, typically less than 75 μm, for example 15 to 55 μm. For unexpanded hollow micro spheres, the mean diameter prior to expansion is typically in the range up 50 μm, more usually less than 30 μm, for example in the range 10 to 20 μm.

The volume proportion of the hollow micro spheres are typically in the range 1-95% v/v, more preferably 5-95% v/v, in particular 50-95% v/v, the foregoing FIGURES referring to the expanded volumes.

As a further embodiment, Embodiment 7, the invention provides a composition as defined in any preceding Embodiment, wherein the compressible hollow microspheres are expanded.

As a further embodiment, Embodiment 8, the invention provides a composition as defined in Embodiment 7, wherein the expanded compressible hollow microspheres have an average diameter in the range of 15 to 55 μm.

As a further embodiment, Embodiment 9, the invention provides a composition as defined in Embodiment 7, wherein the expanded compressible hollow microspheres have an average diameter in the range of 20 to 40 μm.

As a further embodiment, Embodiment 10, the invention provides a composition as defined in Embodiment 7, wherein the expanded compressible hollow microspheres have an average diameter in the range of 25 to 35 μm.

As a further embodiment, Embodiment 11, the invention provides a composition as defined in any preceding Embodiment, wherein the microspheres each have a shell formed from a copolymer, such as a copolymer of acrylonitrile and methacrylonitrile (CAS number 38742-70-0).

As a further embodiment, Embodiment 12, the invention provides a composition as defined in any preceding Embodiment, wherein the composition contains substantially no thixotropic agent other than the organic polymeric gelling agent.

The term 'thixtropic agent' refers to a material which has a time-dependent, shear-thinning viscosity.

The styrene block copolymer may possess a di-block, a triblock, or a multi-arm molecular configuration.

As a further embodiment, Embodiment 13, the invention provides a composition as defined in any preceding Embodiment, wherein the organic polymeric gelling agent comprises a styrene block copolymer selected from styrene-ethylene/butylene styrene tri-block copolymer (SEBS), styrene-ethylene/propylene di-block copolymer (SEP), styrene-butadiene-styrene tri-block copolymer (SBS) and styrene-isoprene-styrene tri-block copolymer (SIS); or a mixture thereof.

As a further embodiment, Embodiment 14, the invention provides a composition as defined in any preceding Embodiment, wherein the organic polymeric gelling agent comprises a styrene-ethylene/propylene di-block copolymer (SEP). Suitable commercially available styrene-ethylene/propylene di-block copolymers (SEPs) include the copolymers available under the trademark Kraton™ or Septon™.

As a further embodiment, Embodiment 15, the invention provides a composition as defined in any preceding Embodiment, comprising from 1 to 10 wt % of the organic polymeric gelling agent.

As a further embodiment, Embodiment 16, the invention provides a composition as defined in any preceding Embodiment, comprising from 2 to 9 wt % of the organic polymeric gelling agent.

As a further embodiment, Embodiment 17, the invention provides a composition as defined in any preceding Embodiment, comprising from 3 to 8 wt % of the organic polymeric gelling agent.

As a further embodiment, Embodiment 18, the invention provides a composition as defined in any preceding Embodiment, wherein the composition additionally comprising an anti-oxidant.

As a further Embodiment, Embodiment 19, the invention provides a composition as defined in Embodiment 18, wherein the anti-oxidant is selected from pentaerythritol tetrakis(β-laurylthiopropionate) (CAS No. 29598-76-3, Nauguard™ 412 S), phenolic anti-oxidants (Brad-Chem™ 339), tetrakismethylene (3,5-di-tert-butyl-4-hydroxyhydrocinnamate) methane (Brad-Chem™ 391), thiodiethylene bis[3-(3,5-di-tert-butyl-4-hydroxyphenyl)propionate] (Brad-Chem™ 395), octylated phenyl-alpha-naphthylamine (Irganox™ L 06, BASF), octylated/butylated diphenylamine (Irganox™ L 57, BASF), a high weight phenolic anti-oxidant containing a thioether group (Irganox™ L115), a high weight phenolic anti-oxidant (Irganox™ L 135, BASF), Benzenamine, N-phenyl-(CAS number 68411-46-1, Irganox™ L 55, BASF), and a mixture of aminic and high molecular weight phenolic antioxidants (Irganox™ L150, BASF), and combinations thereof.

As a further embodiment, Embodiment 20, the invention provides a composition as defined in Embodiment 19, wherein the anti-oxidant is selected from pentaerythritol tetrakis(β-laurylthiopropionate) (CAS No. 29598-76-3, Nauguard™ 4125) and tetrakismethylene (3,5-di-tert-butyl-4-hydroxyhydrocinnamate) methane (Brad-Chem™ 391), and mixtures thereof.

As a further embodiment, Embodiment 21, the invention provides a composition as defined in any preceding Embodiment, wherein the composition comprises from 0.1 to 1 wt % anti-oxidant.

As a further embodiment, Embodiment 22, the invention provides a composition as defined in any preceding Embodiment, wherein the composition additionally comprises a pour point depressant, and/or silica, and/or a wetting agent, such as polypropylene glycol (PPG).

Suitable commercially available pour point depressants include Viscoplex™ 1-180 (Evonik) and Irgaoflo™ 649P (BASF), a dispersion of alkyl methacrylate co-polymer in mineral oil.

As a further embodiment, Embodiment 23, the invention provides the use of a composition as defined in any preceding Embodiment as a cable filler.

As a further embodiment, Embodiment 24, the invention provides a cable, such as a fibre optic cable, containing a composition as defined in any one of Embodiments 1 to 22.

As a further embodiment, Embodiment 25, the invention provides a cable comprising a conducting core surrounded by a sheath, a composition as defined in any one of Embodiments 1 to 22 being disposed between the conducting core and the sheath, wherein the sheath comprises polypropylene.

The conducting core can be, for example, an electrical conductor or a light conductor. The electrical conductor can be, for example, a conductor for conducting electrical signals such as telephone signals.

As a further embodiment, Embodiment 26, the invention provides a process for making a cable comprising a conducting core and a sheath, the process comprising the step of extruding the cable sheath onto the conducting core and interposing a composition, as defined in any of Embodiments 1 to 22, between the conducting core and sheath during the extrusion step.

The compositions of the present invention may be prepared by a process comprising the steps:

(a) heating the natural oil to a temperature in the range 110° C. to 120° C.;
(b) adding the polymeric gelling agent to the oil and blending to form a mixture;
(c) cooling the mixture to a temperature of less than 90° C.;
(d) adding and blending in the microspheres; and optionally
(e) adding and blending in an anti-oxidant: and/or
(f) maintaining the mixture under vacuum to remove entrapped gas.

Preferably the process comprises the steps:

(i) blending at least one natural oil in a heating-blending tank;
(ii) heating the blended oil(s) to 110-120° C. in a stirred heating-blending tank;
(iii) adding and blending the polymeric gelling agent to the oil(s) under high shear for no more than one hour after transfer of the oil(s) to a blending-cooling tank, allowing the temperature of the blend to rise to more than 120-130° C.;
(iv) cooling the blend to 90° C. and transferring to a stirred main reactor;
(v) adding and blending an anti-oxidant;
(vi) adding and blending the microspheres, drawn to the reactor under vacuum or pumping, for at least two minutes;
(vii) maintaining the vacuum for at least another 10 minutes in order to effect removal of air bubbles prior to release of the finished gel.

As used herein, the term "high-oleic acid" refers to an oil containing 60% or greater oleic acid, preferably 70% or greater oleic acid; more preferably 75% or greater oleic acid; more preferably 80% or greater oleic acid.

EXAMPLES

FIG. 1 shows an optical cable 21 comprising three optical fibre buffer tubes 23 encased in cladding 22. The optical fibre buffer tubes 23 themselves consist of an optical fibre 24 provided with a protective coating 26 and a protective sheath 25. The filler composition of the invention 27 is disposed between the coated optical fibre and the protective sheath. Additionally, it fills the interstices formed between individual buffer tubes and between the buffer tubes and the internal surface of the cable cladding.

Examples of specific gels suitable for use in fibre optic cables, such as the cables illustrated in FIG. 1 are as follows:

Example 1

A gel filler was prepared having the following composition:

| Material | Function | % (Weight) | Weight (g) |
|---|---|---|---|
| Agri-pure ™ 80 oil High oleic sunflower oil | Base Oil | 87 | 435 |
| Kraton ™ XPH200 thermoplastic elastomer | Organic polymeric gelling agent | 6.5 | 32.5 |
| BradChem ™ 391 | Anti-oxidant | 0.5 | 2.5 |
| Nauguard ™ 412S | Anti-oxidant | 0.5 | 2.5 |
| Irgaflo ™ 649P | Pour point depressant | 0.5 | 2.5 |
| Expancel ™ microspheres | Microsphere | 3.0 | 15.0 |
| Fumed silica | Silica | 2.0 | 10.0 |
| Total Mix: | | | 500 |

BradChem ™ 391: Pentaerythritol tetrakis 3-(3,5-di-tert-butyl-4-hydroxylphenyl)propionate, CAS No. 6683-19-8.
Nauguard ™ 412S: Pentaerythritol tetrakis(β-laurylthiopropionate), CAS No. 29598-76-3
Irgaflo ™ 649P: Methacrylate polymers dispersed in a mineral oil
Expancel ™ microspheres: hollow microspheres with a thermoplastic shell (supplied by Nouryon).
Kraton ™ XPH200: di-block type SEP styrene ethylene/propylene copolymer The gel filler was prepared by weighing out all materials other than the polymer, silica and the microsphere and heating these together at 120° C. with the hot plate set to 250° C. The polymer was added and the mixture mixed on half speed for 2 hours while the temperature was maintained at 120° C. then left overnight. The microspheres were added, followed by the silica, slowly by hand, and mixed on high speed for 5 minutes until smooth. The mixture was degassed.

The following Examples were prepared by an analogous process.

Example 2

| Material | Function | % (Weight) |
|---|---|---|
| Agripure ™ 80 High oleic sunflower oil | Base Oil | 88 |
| Kraton ™ XPH200 thermoplastic elastomer | Organic polymeric gelling agent | 6.5 |
| Irganox ™ L115 | Anti-oxidant | 0.5 |
| Nauguard ™ 412S | Anti-oxidant | 0.5 |
| Irgaflo ™ 649P | Pour point depressant | 0.5 |
| Expancel ™ microspheres 920 DET 40d25 | Microsphere | 2.5 |
| Fumed Silica | Silica | 1.0 |
| PPG | Wetting agent | 0.5 |

Irganox ™ L115: a high weight phenolic anti-oxidant containing a thioether group
PPG: polypropylene glycol Comparative Example A

| Raw Material/Formulation | Function | % (Weight) |
|---|---|---|
| PAO 6 | Base Oil | 88.35 |
| Kraton ™ 1701 | Organic polymeric gelling agent | 8.00 |
| Brad-Chem ™ 395/Irganox ® L115 | Anti-oxidant | 0.15 |
| Expancel ™ microspheres 092DET 40 | Microsphere | 3.00 |
| Pour Point Depressant (such as Irgaoflo ™ 649P) | Pour point depressant | 0.50 |

PAO 6: 1-decene homopolymer hydrogenated, CAS number 68037-01-4, a polyalphaolefin oil commerically available from PetroCanada ™ or Tulstar ™
Kraton ™ 1701: a styrenic block copolymer The inventors have surprisingly found that base oils comprising a minimum of 80% bio-based oil, as used in the present invention, have low weight gain compatibility indication, preferably 10% or lower; more preferably 5% or lower.

Compatibility testing is carried out at elevated temperature over an extended time period and is essentially an accelerated ageing test. The period of storage that the chosen time period and temperature is equivalent to can be calculated using the following equation:

$$\text{Real Time Equivalent } (RT) = \text{Accelerated Ageing Time } (AAT) \times Q_{10}^{\left[\frac{T_{AA}-T_{RT}}{10}\right]}$$

| Parameter | Meaning | Value |
|---|---|---|
| RT | Equivalent period in real time if stored a tambient temperature | Calculated |
| AAT | Time for which sample is held at elevated temperature | 28 days or otherwise specified |
| $Q_{10}$ | Ageing factor | 2.5 |
| $T_{AA}$ | Accelerated ageing factor | 80° C. |
| $T_{RT}$ | Ambient temperature | Measured |

Using the above equation, it can be calculated that a test period of 28 days at 80° C. is equivalent to 17.08 years of storage at ambient temperature if the ambient temperature is assumed to be 21° C.

The compositions comprising the base oils of the present invention were tested for weight gain compatibility in accordance with the following standard test method:

1. Petri dishes were prepared holding pieces of optical fibre (approximately 9 cm in length).
2. Gels samples comprising the base oils were added to the petri dishes, submerging the pieces of optical fibre. One petri dish was left without gel as a control.
3. Both the control petri dish and the sample petri dishes were placed in the oven at 80° C. and left for 28 days.
4. At the end of the test period, the petri dishes were removed from the oven and allowed to cool.
5. The fibre samples were removed, wiped, and checked for stability of the coloured coating.

When tested for compatibility with Borealis™ Polypropylene (PP1121-01) test pieces, the following results were obtained.

Table 1 provides test results for oils in accordance with the invention, and for comparative oils.

TABLE 1

| OIL | % Thickness change at End of Test | Time (days) | WEIGHT (g) A | % CHANGE A | WEIGHT (g) B | % CHANGE B | % Ave. (A + B) |
|---|---|---|---|---|---|---|---|
| Control sample | N/A | 0 | 1.4379 | | 1.5834 | | |
| | | 7 | 1.4361 | −0.1252 | 1.5819 | −0.0947 | −0.1 |
| | | 14 | — | | — | | |
| | | 21 | 1.4369 | −0.0695 | 1.5822 | −0.0758 | −0.1 |
| | | 28 | 1.4362 | −0.1182 | 1.5818 | −0.1010 | −0.1 |
| Cargill Agri Pure ™ 60 | N/A | 0 | 1.4474 | | 1.5720 | | |
| | | 7 | 1.4696 | 1.5338 | 1.5968 | 1.5776 | 1.6 |
| | | 14 | — | | — | | |
| | | 21 | 1.4947 | 3.2679 | 1.6236 | 3.2824 | 3.3 |
| | | 28 | 1.5021 | 3.7792 | 1.6320 | 3.8168 | 3.8 |
| Petro Canada ™ Purity 1810 PAO 6* | N/A | 0 | 1.4388 | | 1.5822 | | |
| | | 7 | 1.6434 | 14.2202 | 1.7977 | 13.6203 | 13.9 |
| | | 14 | — | | — | | |
| | | 21 | 1.7226 | 19.7248 | 1.8902 | 19.4666 | 19.6 |
| | | 28 | 1.7378 | 20.7812 | 1.9060 | 20.4652 | 20.6 |
| Petro Canada ™ Purity 1810 Risella ™ X430* | N/A | 0 | 1.4912 | | 1.5294 | | |
| | | 7 | 1.6565 | 11.0850 | 1.7063 | 11.5666 | 11.3 |
| | | 14 | — | | — | | |
| | | 21 | 1.7426 | 16.8589 | 1.7882 | 16.9217 | 16.9 |
| | | 28 | 1.7573 | 17.8447 | 1.8033 | 17.9090 | 17.9 |

Control indicates a blank Borealis ™ Polypropylene (PP1121-01) test piece (i.e. no oil is applied).
*indicates an oil which is a comparative example and not a composition of the invention.
Cargill Agri Pure ™ 60 (Cargill) is a refined canola oil comprising 60% oleic acid.
Petro Canada ™ Purity 1810 PAO 6 (Petro-Canada ™) is a 50-50 blend-stock of a petrochemical oil and a polyalphaolefin with CAS number 68037-01-4.
Petro Canada ™ Purity 1810 Risella ™ X430 is a 50-50 blend stock of a petrochemical oil and a gas-to-liquid oil with CAS number 848301-69-9.
It can clearly be seen from Table 1 that the use of the bio-based oil Cargill Agri Pure ™ 60, a canola oil, reduces the weight gain compatibility indication after 28 days at 80° C. to 3.8%. This is a significant reduction in weight gain compatibility indication when compared to two traditional blend stock oils, Petro Canada ™ Purity 1810 PAO 6 (Petro-Canada ™) and Petro Canada ™ Purity 1810 Risella ™ X430, which were observed to have a weight gain compatibility indication after 28 days of 20.6% and 17.6% respectively.

Table 2 provides test results for gel compositions comprising an oil in accordance with the invention and a comparative oil respectively.

TABLE 2

| EXAMPLE | % Thickness change at End of Test | Time (days) | WEIGHT (g) A | % CHANGE A | WEIGHT (g) B | % CHANGE B | % Ave. (A + B) |
|---|---|---|---|---|---|---|---|
| EXAMPLE 2 | Start: 0.0773 | 0 | 1.4429 | | 1.5792 | | |
| | 1.3% | 7 | 1.4665 | 1.6356 | 1.6054 | 1.6591 | 1.6 |
| | End: 0.0783 | 14 | 1.4820 | 2.7098 | 1.6225 | 2.7419 | 2.7 |
| | | 21 | 1.4942 | 3.5553 | 1.6358 | 3.5841 | 3.6 |
| | | 28 | 1.5019 | 4.0890 | 1.6448 | 4.1540 | 4.1 |
| COMPARATIVE EXAMPLE A | Start: 0.0775 | 0 | 1.4337 | | 1.5343 | | |
| | −1.6% | 7 | 1.6399 | 14.3824 | 1.7597 | 14.6907 | 14.5 |
| | End: 0.0763 | 14 | 1.7015 | 18.6789 | 1.8197 | 18.6013 | 18.6 |
| | | 21 | 1.7234 | 20.2065 | 1.8427 | 20.1004 | 20.2 |
| | | 28 | 1.7370 | 21.1551 | 1.8576 | 21.0715 | 21.1 |

It can be seen from Table 2 that the composition of Example 2 exhibited a low weight gain compatibility indication after 28 days of 4.1%. This contrasts with the significantly higher weight gain compatibility indication observed after 28 days for Comparative Example A, a composition comprising a petroleum oil (PAO 6), of 21.1%.

The invention claimed is:

1. A composition for use as a cable filler, comprising a dispersion of compressible hollow microspheres in a gel, the gel comprising: a base oil comprising a minimum of 80% bio-based oil; and an organic polymeric gelling agent comprising a styrene block copolymer, wherein the composition comprises from 50-99 wt % base oil and from 1 to 10 wt % of the organic polymeric gelling agent.

2. A composition as defined in claim 1, wherein the base oil comprises sunflower oil, rapeseed oil, castor oil, canola oil, soybean oil, corn oil, or a mixture thereof.

3. A composition as defined in claim 1, wherein the composition comprises from 80-99 wt % base oil.

4. A composition as defined in claim 1, wherein the compressible hollow microspheres are expanded.

5. A composition as defined in claim 1, wherein the compressible hollow microspheres are expanded with an average diameter in the range of 15 to 55 μm.

6. A composition as defined in claim 1, wherein the compressible hollow microspheres each have a shell formed from a copolymer.

7. A composition as defined in claim 1, wherein the organic polymeric gelling agent comprises a styrene block copolymer selected from styrene-ethylene/butylene styrene tri-block copolymer (SEBS), styrene-ethylene/propylene di-block copolymer (SEP), styrene-butadiene-styrene tri-block copolymer (SBS) and styrene-isoprene-styrene tri-block copolymer (SIS); or mixtures thereof.

8. A composition as defined in claim 1, comprising from 3 to 8 wt % of the organic polymeric gelling agent.

9. A composition as defined in claim 1, the composition additionally comprising an anti-oxidant.

10. A composition as defined in claim 1, the composition additionally comprising an anti-oxidant selected from pentaerythritol tetrakis(β-laurylthiopropionate) (CAS No. 29598-76-3), phenolic anti-oxidants, tetrakismethylene (3,5-di-tert-butyl-4-hydroxyhydrocinnamate) methane, thiodiethylene bis[3-(3,5-di-tert-butyl-4-hydroxyphenyl)propionate], octylated phenyl-alpha-naphthylamine, octylated/butylated diphenylamine, a high weight phenolic anti-oxidant containing a thioether group, a high weight phenolic anti-oxidant, Benzenamine, N-phenyl- (CAS number 68411-46-1), and a mixture of aminic and high molecular weight phenolic antioxidants, and combinations thereof.

11. A composition as defined in claim 1, wherein the composition comprises from 0.1 to 1 wt % anti-oxidant.

12. A cable comprising a composition as defined in claim 1.

13. A cable comprising a conducting core surrounded by a sheath, a composition, as defined in claim 1, being disposed between the conducting core and the sheath, wherein the sheath comprises polypropylene.

14. A process for making a cable comprising a conducting core and a sheath, the process comprising the step of extruding the cable sheath onto the conducting core and interposing a composition, as defined in claim 1, between the conducting core and sheath during the extrusion step.

15. A composition as defined in claim 6, wherein the copolymer is a copolymer of acrylonitrile and methacrylonitrile (CAS number 38742-70-0).

16. A composition as defined in claim 1, wherein the composition comprises from 80-99 wt % base oil and from 3 to 8 wt % of the organic polymeric gelling agent.

* * * * *

UNITED STATES PATENT AND TRADEMARK OFFICE
CERTIFICATE OF CORRECTION

| | |
|---|---|
| PATENT NO. | : 12,110,396 B2 |
| APPLICATION NO. | : 17/378510 |
| DATED | : October 8, 2024 |
| INVENTOR(S) | : Scott Allen et al. |

It is certified that error appears in the above-identified patent and that said Letters Patent is hereby corrected as shown below:

In the Specification

Column 4, Line 41, "412 S" should be --412S--.

Column 4, Line 48, "4125" should be --412S--.

Column 8, Line 4, "a tambient" should be --at ambient--.

Signed and Sealed this
Twenty-fifth Day of February, 2025

Coke Morgan Stewart
*Acting Director of the United States Patent and Trademark Office*